(12) United States Patent
Frost et al.

(10) Patent No.: US 10,811,716 B2
(45) Date of Patent: Oct. 20, 2020

(54) ION-CONDUCTING MEMBRANE

(71) Applicant: JOHNSON MATTHEY FUEL CELLS LIMITED, London (GB)

(72) Inventors: Jonathan Charles Frost, Henley on Thames (GB); Jonathan David Brereton Sharman, Reading (GB); Nadia Michele Permogorov, Oxfordshire (GB)

(73) Assignee: Johnson Matthey Fuel Cells Limited, London (GB)

(*) Notice: Subject to any disclaimer, the term of this patent is extended or adjusted under 35 U.S.C. 154(b) by 173 days.

(21) Appl. No.: 14/408,168

(22) PCT Filed: Jul. 10, 2013

(86) PCT No.: PCT/GB2013/051820
§ 371 (c)(1),
(2) Date: Dec. 15, 2014

(87) PCT Pub. No.: WO2014/009721
PCT Pub. Date: Jan. 16, 2014

(65) Prior Publication Data
US 2015/0180073 A1 Jun. 25, 2015

(30) Foreign Application Priority Data
Jul. 10, 2012 (GB) .................... 1212229.7

(51) Int. Cl.
*H01M 8/1053* (2016.01)
*H01M 4/88* (2006.01)
(Continued)

(52) U.S. Cl.
CPC ........ *H01M 8/1053* (2013.01); *C08J 5/2281* (2013.01); *C08J 7/0427* (2020.01);
(Continued)

(58) Field of Classification Search
CPC .......................... H01M 8/1053; H01M 8/1055
See application file for complete search history.

(56) References Cited

U.S. PATENT DOCUMENTS 5,955,215 A 9/1999 Kurzweil et al.
6,110,330 A 8/2000 Lin et al.
(Continued)

FOREIGN PATENT DOCUMENTS

CN 101326220 A 12/2008
EP 0814897 A1 1/1998
(Continued)

OTHER PUBLICATIONS

Zarrin ("Functionalized Graphene Oxide Nanocomposite Membrane for Low Humidity and High Temperature Proton Exchange Membrane Fuel Cells", Journal of Physical Chemistry C, vol. 115, Nr:42, pp. 20774-20781).*
(Continued)

*Primary Examiner* — Barbara L Gilliam
*Assistant Examiner* — Nathanael T Zemui
(74) *Attorney, Agent, or Firm* — BakerHostetler

(57) ABSTRACT

An ion-conducting membrane includes: (i) a first ion-conducting layer including one or more first ion-conducting polymers; and (ii) a barrier layer including graphene-based platelets.

15 Claims, 1 Drawing Sheet

(51) Int. Cl.
  H01M 8/1041    (2016.01)
  C08J 5/22      (2006.01)
  C08J 7/04      (2020.01)
  H01M 8/1004    (2016.01)
  H01M 8/1018    (2016.01)

(52) U.S. Cl.
  CPC ......... *H01M 4/881* (2013.01); *H01M 8/1004* (2013.01); *H01M 8/1041* (2013.01); *H01M 8/1055* (2013.01); *C08J 2327/18* (2013.01); *C08J 2427/12* (2013.01); *H01M 2008/1095* (2013.01); *H01M 2300/0082* (2013.01); *H01M 2300/0094* (2013.01)

(56) References Cited

U.S. PATENT DOCUMENTS

| | | | |
|---|---|---|---|
| 6,254,978 | B1 | 7/2001 | Bahar et al. |
| 2006/0046122 | A1* | 3/2006 | Chang ............... H01M 4/8605 429/482 |
| 2007/0015022 | A1 | 1/2007 | Chang et al. |
| 2011/0159404 | A1 | 6/2011 | Fuller et al. |
| 2011/0256376 | A1 | 10/2011 | Compton et al. |
| 2012/0021224 | A1 | 1/2012 | Everett et al. |
| 2012/0034541 | A1* | 2/2012 | Muraoka ............. H01M 8/0215 429/456 |
| 2012/0129075 | A1* | 5/2012 | Sugitani ............. H01B 1/122 429/493 |
| 2012/0172461 | A1* | 7/2012 | Tsai ................. H01M 2/16 521/27 |
| 2012/0301707 | A1* | 11/2012 | Kinloch ............. B82Y 30/00 428/332 |
| 2012/0308851 | A1* | 12/2012 | Akiyama ............. H01M 16/006 429/9 |
| 2013/0065154 | A1* | 3/2013 | Lee .................. H01M 8/1051 429/465 |

FOREIGN PATENT DOCUMENTS

| | | | |
|---|---|---|---|
| EP | 1833113 A1 | | 9/2007 |
| JP | 2001504264 A | | 3/2001 |
| JP | 2005032520 A | | 2/2005 |
| JP | 2005510828 A | | 4/2005 |
| JP | 2006073529 A | | 3/2006 |
| JP | 2007207651 A | | 8/2007 |
| JP | 2009048909 A | | 3/2009 |
| JP | 2011098843 A | | 5/2011 |
| JP | 2014107026 A | | 6/2014 |
| WO | 2005020356 A1 | | 3/2005 |
| WO | 2009109780 A1 | | 9/2009 |
| WO | WO-2011086391 A1 * | 7/2011 | ............. B82Y 30/00 |

OTHER PUBLICATIONS

Si, "Trilayer Membranes with a Methanol-Barrier Layer for DMFCs", Feb. 11, 2004, Journal of the Electrochemical Society, 151 (3) A463-A469.*

Tseng, "Sulfonated Polyimide Proton Exchange Membranes with Graphene Oxide show Improved Proton Conductivity, Methanol Crossover Impedance, and Mechanical Properties", Oct. 4, 2011, Advanced Energy Materials, vol. 1, Issue 6, pp. 1220-1224.*

Dante et al., "Synthesis of graphitic carbon nitride by reaction of melamine and uric acid", Materials Chemistry and Physics 2011, vol. 130, pp. 1094-1102.

Lam et al., "Carbocatalytic dehydration of xylose to furfural in water", Carbon, 2012, vol. 50, pp. 1033-1043.

Madhusudan et al., "Facile synthesis of novel hierarchical graphene-Bi2O2CO2 composites with enhanced photocatalytic perforamance under visible light", Dalton Trans., 2012, vol. 41, pp. 14345-14353.

Marcano et al., "Improved Synthesis of Graphene Oxide", ACS Nano, 2010, vol. 4, No. 8, pp. 4806-4814.

Nethravathi et al., "Graphene-nanocrystalline metal sulphide composites produced by a one-pot reaction starting from graphite oxide", Carbon, 2009, vol. 47, pp. 2054-2059.

Shao et al., "Highly durable graphene nanoplateletes supported Pt nanocatalystics for oxygen reduction", Journal of Power Sources, 2010, vol. 195, pp. 4600-4605.

Shuai et al., "Imaging the O(1D) + CD4 → OD + CD3 Reaction Dynamics: the Threshold of Abstraction Pathway", The Journal of Physical Chemistry Letters, 2012, vol. 3, pp. 1310-1314.

Xu et al., "A polybenzimidazole/sulfonated graphite oxide composite membrane for high temperature polymer electrolyte membrane fuel cells", Journal of Materials Chemistry, 2011, vol. 21, pp. 11359-11364.

Zarrin et al., "Functionalized Graphene Oxide Nanocomposite Membrane for Low Humidity and High Temperature Proton Exchange Membrane Fuel Cells", The Journal of Physical Chemistry, 2011, vol. 115, pp. 20774-20781.

International Search Report, dated Sep. 3, 2013, from corresponding PCT application.

Tseng et al, "Sulfonated Polyimide Proton Exchange Membranes With Graphene Oxide Show Improved Proton Conductivity, Methanol Crossover Impedance, and Mechanical Properties," Advanced Energy Materials, 2011, 1, pp. 1220-1224.

Si, et al., Trilayer Membranes With a Methanol-Barrier Layer for DMFCs, Journal of the Electrochemical Society, 151 (3), Feb. 11, 2004, A463-A469.

Japanese Application No. 2015-521063, Notice of Reasons for Rejection dated May 9, 2017.

* cited by examiner

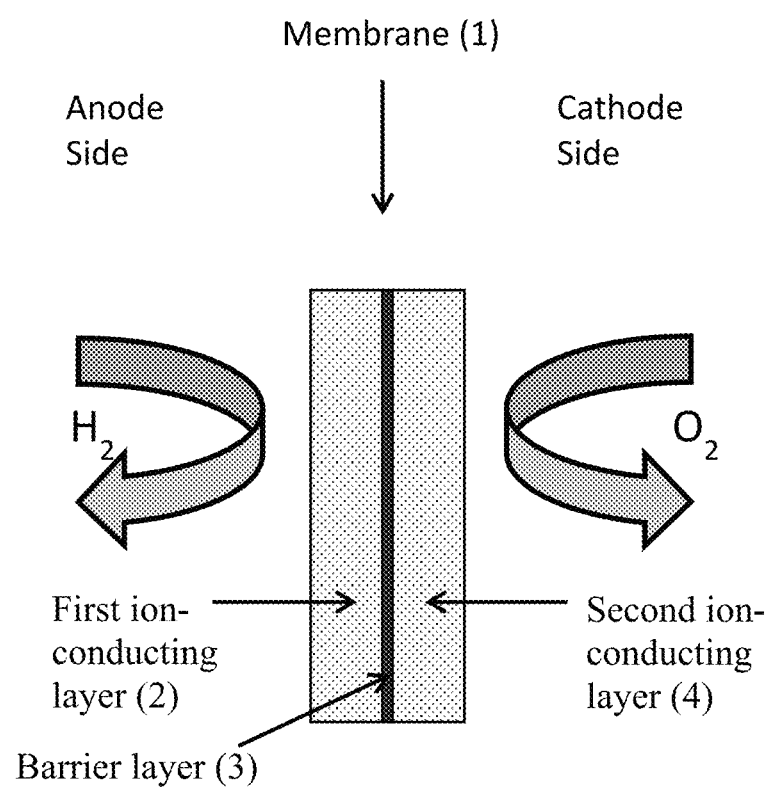

ION-CONDUCTING MEMBRANE

BACKGROUND OF THE INVENTION

Field of the Invention

The present invention relates to a novel ion-conducting membrane, suitable for use in electrochemical devices, for example fuel cells.

Description of the Related Art

A fuel cell is an electrochemical cell comprising two electrodes separated by an electrolyte. A fuel, such as hydrogen or an alcohol such as methanol or ethanol, is supplied to the anode and an oxidant, such as oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

In the hydrogen-fuelled or alcohol-fuelled proton exchange membrane fuel cell (PEMFC), the electrolyte is a solid polymeric membrane, which is electronically insulating and proton conducting. Protons produced at the anode, are transported across the membrane to the cathode, where they combine with oxygen to form water. The most widely used alcohol fuel is methanol, and this variant of the PEMFC is often referred to as a direct methanol fuel cell (DMFC).

The principal component of a hydrogen-fuelled PEMFC or a DMFC is known as a membrane electrode assembly (MEA) and is essentially composed of five layers. The central layer is the polymer ion-conducting membrane. On either side of the ion-conducting membrane there is an electrocatalyst layer, containing an electrocatalyst designed for the specific electrochemical reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

The MEA can be constructed by several methods. The electrocatalyst layer may be applied to the gas diffusion layer to form a gas diffusion electrode. Two gas diffusion electrodes are placed one on either side of an ion-conducting membrane and the electrodes and membrane laminated together to form the five-layer MEA. Alternatively, the electrocatalyst layer may be applied to both faces of the ion-conducting membrane to form a catalyst coated ion-conducting membrane. Subsequently, gas diffusion layers are applied to both faces of the catalyst coated ion-conducting membrane. Finally, an MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically tens or hundreds of MEAs are required to provide enough power for most applications, so multiple MEAs are assembled to make up a fuel cell stack. Field flow plates are used to separate the MEAs. The plates perform several functions: supplying the reactants to the MEAs, removing products, providing electrical connections and providing physical support.

Conventional ion-conducting membranes used in the PEMFCs and DMFCs are generally formed from perfluorinated sulphonic acid (PFSA) ionomers and the membranes formed from these ionomers are sold under the trade names Nation® (E.I. DuPont de Nemours and Co.), Aciplex® (Asahi Kasei), Aquivion® (Solvay) and Flemion® (Asahi Glass KK). Such PFSA based ion-conducting membranes are suitably formed from a polymer having a side chain linked to the backbone of the polymer via an ether linkage. The typical structure of PFSA ionomers is shown below.

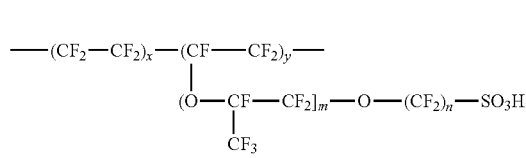

Typical Structure of PFSA Ionomer

The PFSA ion-conducting membrane may contain a reinforcement to provide improved mechanical properties such as increased tear resistance and reduced dimensional change on hydration and dehydration. The preferred reinforcement may be based on, but not exclusively, a microporous web or fibres of a fluoropolymer such as polytetrafluoroethylene (PTFE), as described in U.S. Pat. No. 6,254,978, EP 0814897 and U.S. Pat. No. 6,110,330, or polyvinylidene fluoride (PVDF), or alternative-materials-such as PEEK or polyethylene.

As hydrogen-fuelled PEMFCs employ very thin ionomeric membranes (typically less than 50 μm thick), in part to minimise the ionic resistance and thus minimise the drop in cell voltage due to ohmic losses, the permeation, to some extent, of the reactant gases $H_2$ and $O_2$ across the membranes (so-called gas crossover) is generally inevitable. Gas crossover, and the subsequent catalysed chemical or electrochemical reaction of the crossed-over gas has a detrimental impact on membrane lifetime. It has been widely accepted that hydrogen peroxide ($H_2O_2$) can be generated by the reaction of crossed-over gases on the catalysed or un-catalysed carbon surfaces of the PEMFC electrodes. In turn, the hydrogen peroxide can decompose within the membrane, to form radicals such as hydroperoxyl ($HO_2 \cdot$) and hydroxyl (HO.) species. These oxidising radical species attack the ionomeric component of the membrane, leading to chain scission, unzipping and loss of functional groups. $O_2$ or $H_2$ gas cross-over are the most fundamental governing mechanisms leading to membrane chemical degradation. This chemical degradation, which may or may not be combined with mechanical and thermal degradation, leads to membrane thinning and pinhole formation—which in turn, further accelerates gas cross-over. The impact of such degradation can range from a loss of conductivity and subsequent performance loss (in the case of modest chemical degradation) to individual cell and ultimately, stack, failure. Crossover of reactant gas to the opposite electrode can further reduce cell performance by de-polarising that electrode by parasitic reactions. Finally, the cross-over of reactant gases leads to a direct loss of fuel cell electrical efficiency because although the reactant is consumed, the electrical work is not captured. To further improve the performance of the PEMFC membrane and reduce material costs, thinner membranes have been the focus of recent fuel cell development. This reduction in membrane thickness may lead to a direct increase in gas cross-over; thus there is clearly a requirement to reduce the gas cross-over, without compromising PEMFC performance. There is also a need to improve the mechanical properties of these thin membranes.

In the DMFC there is a need to lower the methanol cross-over from anode to cathode through the solid polymeric membrane of the MEA without lowering the electrical efficiency or power density of the fuel cell. This is required to raise the fuel efficiency and to prevent the lowering of the MEA performance due to poisoning of the oxygen reduction reaction on the cathode by the methanol, the non-useful consumption of oxygen on the cathode by direct chemical oxidation of the methanol and the lowering of the cathode potential by electrochemical oxidation of the crossed-over methanol. Typically, to reduce methanol cross-over, thicker PFSA-based membranes (typically 125 µm thick) are used, but using membranes of this thickness inevitably results in higher ionic resistance and the membranes are intrinsically more costly.

SUMMARY OF THE INVENTION

It is therefore an object of the invention to provide an improved ion-conducting membrane, for use in electrochemical devices and in particular for both hydrogen-fuelled PEMFC and DMFC. In particular it is an object of the invention to provide a membrane, which shows a reduction in reactant cross-over leading to increased durability and fuel efficiency.

Accordingly, the present invention provides an ion-conducting membrane comprising (i) a first ion-conducting layer comprising one or more first ion-conducting polymers; and (ii) a barrier layer comprising graphene-based platelets.

DETAILED DESCRIPTION OF THE INVENTION

The first ion-conducting layer may comprise one first ion-conducting polymer which is suitably a perfluorosulphonic acid polymer having a structure as hereinbefore described and includes polymers sold under the tradenames Nafion® (E.I. DuPont de Nemours and Co.), Aciplex® (Asahi Kasei), Aquivion® (Solvay) and Flemion® (Asahi Glass KK).

Alternatively, the first ion-conducting layer may comprise one first ion-conducting polymer which is a hydrocarbon polymer including those based on polyarylenes, including polyether sulfones (e.g. polyarylene sulfone (PSU, Udel®), polyarylene ether sulfone (PES, Victrex®) and polyether ketones (e.g. polyarylene ether ether ketone (PEEK, Victrex®), polyarylene ether ether ketone ketone (PEEKK, Hostatec®), polyarylene ether ketone ether ketone ketone (PEKEKK, Ultrapec®) and polyarylene ether ketone (PEK, Victrex®)). Suitably, the hydrocarbon polymer is a sulphonated polyarylene ether sulphone.

Alternatively, two or more (suitably two) first ion-conducting polymers are in the first ion-conducting layer, the two or more first ion-conducting polymers being selected from perfluorosulphonic acid polymers, hydrocarbon polymers or a mixture of perfluorosulphonic acid and hydrocarbon polymers. The two or more first ion-conducting polymers may be homogeneous throughout the first ion-conducting layer or non-homogeneous, such that there is enrichment of one first ion-conducting polymer at the interface of the first ion-conducting layer and the barrier layer. Alternatively, the two or more first ion-conducting polymers may be in separate layers in the first ion-conducting layer.

The barrier layer comprises graphene-based platelets and is a graphene-rich layer wherein at least 80%, suitably at least 90% of the barrier layer is composed of the graphene-based platelets. In one embodiment, the barrier layer consists of the graphene-based platelets (i.e. the layer is 100% composed of the graphene-based platelets). Depending on how the graphene-based platelets pack within the barrier layer, there may be voids between the graphene-based platelets. Some, or all, of these voids may comprise a second component and therefore, in one embodiment, the barrier layer comprises a second component in addition to the graphene-based platelets. The second component may be liquid or solid and is capable of transporting protons and liquid water. The second component may be water or an aqueous electrolyte (for example phosphoric acid, sulphuric acid etc.) or an ionomer (for example a perfluorosulphonic acid ionomer, such as Nafion® or a hydrocarbon ionomer). If the second component is an ionomer, it may be the same or different to the first ion-conducting polymer of the first ion-conducting layer.

The graphene-based platelets have a wafer-like shape with an x:y aspect ratio from 0.1 to 10, a x:z aspect ratio of at least 10 and a y:z aspect ratio of at least 10. By the term 'graphene-based platelets' we mean platelets with a structure made up of a single or multiple layers of a graphene layer; a graphene layer is a single carbon layer of the graphite structure as defined by IUPAC. Other terminology may refer to multiple layers of graphene as 'graphite'. Using such terminology, graphene oxide with more than one planar layer of carbon atoms would be called 'graphite oxide'. Regardless of terminology, both single and multiple planar layers of carbon atoms with functional groups (such as oxygen (oxide), sulphonic (sulphonated), sulphur (sulphide) etc) on the external surfaces are intended here.

Examples of such graphene-based platelets include graphene oxide (ACS Nano, 2010, 4, 4806-4814), sulphonated graphene oxide (Carbon, Vol. 50(3), March 2012, pages 1033-1043), graphene sulphide (Carbon, 2009, 47, 8, 2054-2059), graphene hydroxide (J. Phys. Chem. Lett. 2012 1310-1314), graphene carbonate (Dalton Trans., 2012, 41, 14345-14353), graphene nitride (Materials Chemistry and Physics 2011, 130, 3, 1094-1102). Platelets of graphene oxide and sulphonated graphene oxide are preferred, with platelets of graphene oxide being particularly preferred. It is possible that the barrier layer comprises more than one type of graphene-based platelet. The graphene-based platelets in the barrier layer may be arranged in an ordered manner, randomly or a mixture of ordered and random.

In one embodiment of the present invention, the ion-conducting membrane of the invention further comprises a second ion-conducting layer comprising one or more (suitably one or two) second ion-conducting polymers, wherein the second ion-conducting layer is applied to a face of the barrier layer not in contact with the first ion-conducting layer.

The second ion-conducting layer may comprise one second ion-conducting polymer which is suitably a perfluorosulphonic acid polymer having a structure as hereinbefore described and includes polymers sold under the tradenames Nafion® (E.I. DuPont de Nemours and Co.), Aciplex® (Asahi Kasei), Aquivion® (Solvay) and Flemion® (Asahi Glass KK).

Alternatively, the second ion-conducting layer may comprise one second ion-conducting polymer which is a hydrocarbon polymer including those based on polyarylenes, including polyether sulfones (e.g. polyarylene sulfone (PSU, Udel®), polyarylene ether sulfone (PES, Victrex®) and polyether ketones (e.g. polyarylene ether ether ketone (PEEK, Victrex®), polyarylene ether ether ketone ketone (PEEKK, Hostatec®), polyarylene ether ketone ether ketone ketone (PEKEKK, Ultrapec®) and polyarylene ether ketone (PEK, Victrex®)). Suitably, the hydrocarbon polymer is a sulphonated polyarylene ether sulphone.

Alternatively, two or more (suitably two) second ion-conducting polymers are in the second ion-conducting layer, the two or more second ion-conducting polymers being selected from perfluorosulphonic acid polymers, hydrocarbon polymer or a mixture of perfluorosulphonic acid and hydrocarbon polymers. The two or more second ion-conducting polymers may be homogeneous throughout the second ion-conducting layer or non-homogeneous, such that there is enrichment of one second ion-conducting polymer at the interface of the second ion-conducting layer and the barrier layer. Alternatively, the two or more second ion-conducting polymers may be in separate layers in the second ion-conducting layer.

The ion-conducting membrane has a total thickness (i.e. the thickness of the first ion-conducting layer, the barrier layer and, if present, the second ion-conducting layer) of 5 to 200 µm depending on the ultimate use of the membrane. For example, for use in a PEM fuel cell, thicknesses of 5 to 50 µm, more suitably from 10 to 30 µm and preferably from 10 to 20 µm are appropriate. For use in a DMFC, thicknesses of 50 to 200 µm, suitably 50 to 150 µm are appropriate. The most appropriate thickness for any given use would be known to those skilled in the art.

The barrier layer has a minimum thickness of two graphene-based platelets, such as 0.7 nm, and is suitably from 1 nm to 5 µm thick, more suitably from 1 nm to 1 µm thick, more suitably 5 nm to 500 nm thick, preferably from 10 nm to 250 nm thick.

From knowledge of the total required thickness of the membrane and the range of thicknesses for the barrier layer, it is well within the capability of the skilled person to determine the thickness of the first and, if present, second ion-conducting layers. If a second ion-conducting layer is present, the thickness of the second ion-conducting layer may be the same or similar to that of the first ion-conducting layer, or the thickness of the second ion-conducting layer may be considerably less than that of the first ion-conducting layer.

The first and/or second ion-conducting layers may also comprise a reinforcing material. The preferred reinforcing material may be based on, but not exclusively, a microporous web or fibres of a fluoropolymer such as polytetrafluoroethylene (PTFE), as described in U.S. Pat. No. 6,254,978, EP 0814897 and U.S. Pat. No. 6,110,330, or polyvinylidene fluoride (PVDF), or alternative materials such as PEEK or polyethylene. Suitably, the reinforcing material is an expanded-PTFE.

In a further aspect of the invention, and particularly for hydrogen-fuelled PEMFC applications, the ion-conducting membrane further comprises a hydrogen peroxide decomposition catalyst and/or a radical scavenger as described in further detail in WO2009/109780 incorporated herein by reference. The hydrogen peroxide decomposition catalyst may be embedded within the first and/or second ion-conducting layers, present at the interface of the first ion-conducting layer/barrier layer and/or second ion-conducting layer/barrier layer, or present as a coating on the outer face of the first and/or second ion-conducting layers.

The barrier layer may have the same planar area as the first ion-conducting layer, i.e. the first ion-conducting layer and the barrier layer are co-extensive. Alternatively, the barrier layer may be present as one or more patches where reactant cross-over is likely to be highest; for example the barrier layer may be present as a patch at the fuel (e.g. hydrogen or methanol) inlet or may be present as a border around the periphery of the first ion-conducting layer to minimise cross-over where hydrogen peroxide formation may occur, especially where anode and cathode catalyst layers are not exactly coextensive. Alternatively, the barrier layer may correspond to the active area once the ion-conducting membrane is used in a MEA, i.e. as a patch in the centre of the first ion-conducting layer which corresponds to the active catalyst area in a MEA.

If present, the second ion-conducting layer suitably has the same planar area as the first ion-conducting layer, i.e. the first and second ion-conducting layers are co-extensive.

The ion-conducting membrane of the invention may be prepared by applying an aqueous, organic solvent-based or ionomeric dispersion comprising the graphene-based platelets to one side of a pre-existing ion-conducting (e.g. perfluorosulphonic acid or hydrocarbon) membrane (the first ion-conducting layer), by methods which include, but are not limited to spraying, k-bar coating and doctor blading, to form the barrier layer. Suitable materials in which the graphene-based platelets may be dispersed include, but are not limited to, water, ethylene glycol, dimethylformamide, N-methylpyrrolidone and tetrahydrofuran, phosphoric acid, sulphuric acid, perfluorosulphonic acid polymer and sulphonated hydrocarbon polymer. The choice of material in which the graphene-based platelets are dispersed will be dependent on whether any of the material is to remain in the barrier layer as the second component. If the material in which the graphene-based platelets are dispersed is to be removed such that it does not remain in the barrier layer, it can be removed by suitable techniques known to those in the art, e.g. heating, evaporation etc. If a second ion-conducting layer is to be present, a solution/dispersion comprising the one or more second ion-conducting polymers may be applied to the barrier layer using similar methods. Suitable solutions/dispersions comprising the one or more second ion-conducting polymers will be well known to those skilled in the art. Alternatively, a pre-existing ion-conducting (e.g. perfluorosulphonic acid or hydrocarbon) membrane may be bonded to the barrier layer by, for example, hot pressing, roll bonding or other suitable thermo-mechanical methods.

Alternatively, a first ion-conducting layer may be cast (onto e.g. a transfer release substrate such as PTFE or glass sheet) from an appropriate dispersion or solution comprising the one or more first ion-conducting polymers. In the case where the first ion-conducting layer comprises a mixture of first ion-conducting polymers, a solvent system compatible with both polymers is required; selection of such a solvent system is within the capability of the skilled person. When the first ion-conducting layer is sufficiently dried, a dispersion comprising graphene-based platelets as hereinbefore described is applied, for example by one of the techniques listed hereinbefore, to form the barrier layer. If required, a second ion-conducting layer comprising one or more second ion-conducting polymers can be applied to the barrier layer, using a method as hereinbefore described.

Alternatively, a first and a second ion-conducting membrane of the invention each comprising a first ion-conducting layer and a barrier layer may be joined, for example by hot pressing to provide a single ion-conducting membrane. In one embodiment, the barrier layer of the first ion-conducting membrane and the barrier layer of the second ion-conducting membrane are bonded. In this embodiment, it may be necessary to add a bonding agent, e.g. a proton conducting bonding agent such as a thin film of ion-conducting polymer of the types hereinbefore described, to assist bonding of the two barrier layers. In a second embodiment, the barrier layer of the first ion-conducting membrane and the first ion-conducting layer of the second ion-conducting membrane are bonded. In a third embodiment, the first ion-conducting layer of the first ion-conducting membrane and the first ion-conducting layer of the second ion-conducting membrane are bonded.

The ion-conducting membrane of the invention may be used in any electrochemical device requiring an ion-conducting, specifically proton-conducting, membrane. Accordingly, a further aspect of the invention provides an electrochemical device comprising an ion-conducting membrane as hereinbefore described. Alternatively, there is provided the use of an ion-conducting membrane as hereinbefore described in an electrochemical device. Examples of an electrochemical device in which the ion-conducting membrane of the invention may be used include, but are not limited to, fuel cells (such as PEM fuel cells (either using an acidic electrolyte where protons are the charge carrier) or alkaline exchange membrane fuel cells (using an alkaline electrolyte where hydroxyl ions are the charge carrier)), direct alcohol fuel cells, phosphoric acid fuel cells (particularly those with a supporting polymer membrane, such as a polybenzimidazole membrane doped with phosphoric acid)), metal-air cells (where metal ions such as $Li^+$, $Zn^{2+}$ are the charge carrier), hydrogen pumps and electrolysers. In a preferred embodiment of the invention, the ion-conducting membranes are used in fuel cells, for example hydrogen-fuelled PEMFCs or DAFCs (direct alcohol fuel cells), such as DMFCs or direct ethanol fuel cells. When the ion-conducting membranes of the invention are used in hydrogen-fuelled PEMFCs or DAFCs, reduced reactant crossover is seen resulting in a reduction of a mixed potential on the cathode, there is reduced wastage of reactant fuel, and for hydrogen-fuelled PEMFCs, peroxide formation, which causes damage to the membrane, is reduced or eliminated. Thus, the present invention further provides a catalyst-coated ion-conducting membrane comprising an ion-conducting membrane according to the invention and an electrocatalyst layer deposited on at least one side of the ion-conducting membrane. In one embodiment, the catalyst-coated ion-conducting membrane structure has an electrocatalyst layer deposited on both sides of the ion-conducting membrane. If the ion-conducting membrane of the invention has only a first ion-conducting layer present and no second ion-conducting layer, the barrier layer can either be adjacent to the anode electrocatalyst or the cathode electrocatalyst.

The electrocatalyst layers comprise an electrocatalyst which may be a finely divided metal powder (metal black), or may be a supported catalyst wherein small metal particles are dispersed on electrically conducting particulate supports. The support material can be carbon, metal oxide, nitride or carbide or any other inert electrically conductive support with suitably high surface area. The electrocatalyst metal (the primary metal) is suitably selected from (i) the platinum group metals (platinum, palladium, rhodium, ruthenium, iridium and osmium), or
(ii) gold or silver.

The primary metal may be alloyed or mixed with one or more other precious metals such as ruthenium, or base metals such as molybdenum, tungsten, cobalt, chromium, nickel, iron, copper or an oxide thereof. Preferably, the primary metal is platinum. If the electrocatalyst is a supported catalyst, the loading of primary metal particles on the carbon support material is suitably in the range 5-90 wt %, preferably 5-75 wt %.

The electrocatalyst layer(s) may suitably comprise other components, such as ion-conducting polymer, which is included to improve the ionic conductivity within the layer. In one embodiment, the electrocatalyst layer(s) may further comprise one or more hydrogen peroxide decomposition catalysts and/or one or more radical scavengers as hereinbefore described and/or one or more oxygen evolution reaction catalysts in the anode and/or cathode. Preparation routes for preparing electrocatalyst layers comprising these components will be known to the skilled person.

A still further aspect of the invention provides a MEA comprising an ion-conducting membrane or a catalyst-coated ion-conducting membrane as hereinbefore described. The MEA may be made up in a number of ways including, but not limited to:

an ion-conducting membrane of the invention may be sandwiched between two gas diffusion electrodes (one anode and one cathode);

(ii) a catalyst-coated ion-conducting membrane of the invention coated on one side only by a catalyst layer and sandwiched between a gas diffusion layer and a gas diffusion electrode, the gas diffusion layer contacting the side of the ion-conducting membrane coated with the catalyst layer or;

(iii) a catalyst-coated ion-conducting membrane of the invention coated on both sides with a catalyst layer and sandwiched between two gas diffusion layers.

The anode and cathode gas diffusion layers are suitably based on conventional non-woven carbon fibre gas diffusion substrates such as rigid sheet carbon fibre papers (e.g. the TGP-H series of carbon fibre papers available from Toray Industries Inc., Japan) or roll-good carbon fibre papers (e.g. the H2315 based series available from Freudenberg FCCT KG, Germany; the Sigracet® series available from SGL Technologies GmbH, Germany; the AvCarb® series available from Ballard Material Products, United States of America; or the N0S series available from CeTech Co., Ltd. Taiwan), or on woven carbon fibre cloth substrates (e.g. the SCCG series of carbon cloths available from the SAATI Group, S.p.A., Italy; or the WOS series available from CeTech Co., Ltd, Taiwan). For many PEMFC (including DMFC) applications the non-woven carbon fibre paper, or woven carbon fibre cloth substrates are typically modified with a hydrophobic polymer treatment and/or application of a microporous layer comprising particulate material either embedded within the substrate or coated onto the planar faces, or a combination of both, to form the gas diffusion layer. The particulate material is typically a mixture of carbon black and a polymer such as polytetrafluoroethylene (PTFE). Suitably the gas diffusion layers are between 100 and 300 µm thick. Preferably there is a layer of particulate material such as carbon black combined with PTFE on the faces of the gas diffusion layers that contact the electrocatalyst layers.

The MEA may further comprise components that seal and/or reinforce the edge regions of the MEA for example as described in WO2005/020356. The MEA is assembled by conventional methods known to those skilled in the art.

A yet further aspect of the invention provides a fuel cell comprising an ion-conducting membrane, a catalyst-coated ion-conducting membrane or a MEA as hereinbefore described.

The invention is described further with reference to the FIGURE and following example, all of which are illustrative and not intended to be limiting.

FIG. 1 is a schematic diagram showing an example of an ion-conducting membrane of the invention. The diagram depicts an ion-conducting membrane (1) having an anode side supplied with hydrogen and a cathode side supplied with oxygen. Ion-conducting membrane (1) comprises a first ion-conducing layer (2), a barrier layer (3) and a second ion-conducting layer (4). First ion-conducting layer (2) and second ion-conducting layer (4) are formed from one or more proton conducting polymers as hereinbefore described and may, or may not, be reinforced. Barrier layer (3) comprises graphene-based platelets and optionally a second component as hereinbefore described.

Although FIG. 1 shows a membrane having a first ion-conducting layer (2) and second ion-conducting layer (4), it will be clear to one skilled in the art that the membrane may comprise only the first ion-conducting layer (2) and barrier layer (3); in this case, the barrier layer (3) could be adjacent to the cathode side or alternatively could be adjacent to the anode side. Furthermore, FIG. 1 shows first ion-conducting layer (2) and second ion-conducting layer (4) to be of similar thickness; it will be clear to one skilled in the art that this is not essential and one of the first and second ion-conducting layers may be considerably thinner than the other.

Although not depicted in FIG. 1, all other embodiments which would be clear to one skilled in the art are within the scope of the present invention.

EXAMPLE

Graphene oxide was prepared by following the method of Tour et al disclosed in *ACS Nano*, 2010, 4 (8), pp 4806-4814.

A dispersion of the graphene oxide in water was prepared by ultra-sonicating a 1.3 wt % dispersion for 30 minutes at room temperature. The dispersion was then further diluted by adding 3 volumes of water to one volume of dispersion.

15 g of a 2 wt % dispersion of Aquivion® PFSA ionomer (Solvay) in 50/50 wt % water/isopropanol was spray-coated onto a heated polytetrafluoroethylene sheet held in place on a vacuum bed. A quantity of the graphene oxide dispersion sufficient to form an approximately 1 µm thick layer was spray-coated onto the ionomer layer. Finally, a further 15 g of the Aquivion® PFSA ionomer dispersion described above was spray-coated onto the graphene oxide layer to form an ion-conducting membrane of the invention (Example 1)

A reference ion-conducting membrane (Comparative Example 1) was prepared by spray-coating onto a heated PTFE sheet 30 g of the Aquivion® PFSA dispersion described above.

The two ion-conducting membranes (Example 1 and Comparative Example 1) were hot-pressed at elevated temperature and pressure for 10 minutes.

Membrane electrode assemblies were prepared by hot pressing the membrane to Pt black electrodes, with a Pt loading of 3-3.85 mg/cm$^2$, at elevated temperature and pressure for 2 minutes. The membrane thickness in both cases was approximately 40 µm.

Electrochemical testing was carried out in a 6 cm$^2$ active area fuel cell at 80° C. using ambient and 7 psig pressures. Gases were humidified at 75° C. Hydrogen crossover was measured by recording the current passed when applying 0.35 to 0.45V to the cell with 200 ml/min H$_2$ fed to one electrode and 400 ml/min N$_2$ to the other. The number of moles of hydrogen that crossed the membrane were calculated from the current. Membrane resistance was measured by the current interrupt technique at 0.5 A/cm$^2$ on H$_2$/air at ambient pressure. The results of the current, calculated H$_2$ cross-over and membrane resistance are given in Table 1:

TABLE 1

|  | Current (mA/cm$^2$) | | H$_2$ per cm$^2$ per second crossed to cathode (nano-moles) | | Membrane |
| --- | --- | --- | --- | --- | --- |
|  | Ambient pressure | 7 psig pressure | Ambient pressure | 7 psig pressure | Resistance (ohm · cm$^2$) |
| Example 1 | 4.12 | 2.89 | 10.7 | 15.0 | 0.067 |
| Comparative Example 1 | 2.93 | 2.07 | 15.2 | 21.4 | 0.058 |

Example 1 (with a barrier layer) clearly demonstrates a reduction in the cross-over of H$_2$ from the anode to the cathode when compared with Comparative Example 1 (without the barrier layer) with only a small increase in the resistance of the membrane of Example 1 compared to Comparative Example 1.

The invention claimed is:

1. A catalyst-coated ion-conducting membrane comprising an ion-conducting membrane and an electrocatalyst layer deposited on at least one side of the ion conducting membrane, wherein the ion-conducting membrane comprises:
   (i) a first ion-conducting layer comprising one or more first ion-conducting polymers; and
   (ii) a barrier layer consisting of graphene-based platelets, and,
   (iii) a second ion-conducting layer comprising one or more second ion-conducting polymers, wherein the second ion-conducting layer is applied to a face of the barrier layer not in contact with the first ion-conducting layer,
   and wherein
   the ion-conducting membrane has a total thickness of 5 to 50 µm and the barrier layer has a thickness of from 1 nm to 1 µm.

2. The catalyst-coated ion-conducting membrane according to claim 1, wherein the graphene-based platelets have an x:y aspect ratio of 0.1 to 10, a x:z aspect ratio of at least 10 and a y:z aspect ratio of at least 10.

3. The catalyst-coated ion-conducting membrane according to claim 1, wherein the graphene-based platelets are selected from the group consisting of graphene oxide, sulphonated graphene oxide, graphene sulphide, graphene hydroxide, graphene carbonate and graphene nitride.

4. The catalyst-coated ion-conducting membrane according to claim 3, wherein the graphene-based platelets are graphene oxide.

5. The catalyst-coated ion-conducting membrane according to claim 1, wherein an electrocatalyst layer is deposited on both sides of the ion-conducting membrane.

6. A membrane electrode assembly comprising a catalyst-coated ion-conducting membrane according to claim 1.

7. A membrane electrode assembly comprising a catalyst-coated ion-conducting membrane according to claim 5.

8. The catalyst-coated ion-conducting membrane according to claim 1, wherein the graphene-based platelets have an x:y aspect ratio of 0.1 to 10, a x:z aspect ratio of at least 10 and a y:z aspect ratio of at least 10.

9. The catalyst-coated ion-conducting membrane according to claim 1, wherein the graphene-based platelets are selected from the group consisting of graphene oxide, sulphonated graphene oxide, graphene sulphide, graphene hydroxide, graphene carbonate and graphene nitride.

10. The catalyst-coated ion-conducting membrane according to claim 1, which further comprises a second ion-conducting layer comprising one or more second ion-conducting polymers, wherein the second ion-conducting layer is applied to a face of the barrier layer not in contact with the first ion-conducting layer.

11. The catalyst-coated ion-conducting membrane according to claim 1, wherein the barrier layer has a thickness of from 5 nm to 500 nm.

12. The catalyst-coated ion-conducting membrane according to claim 1, wherein the ion-conducting membrane has a total thickness of 10 to 30 μm and the barrier layer has a thickness of from 10 nm to 250 nm.

13. The catalyst-coated ion-conducting membrane according to claim 1, wherein barrier layer has a thickness of from 1 nm to 250 nm.

14. The catalyst-coated ion-conducting membrane according to claim 1, wherein the first ion-conducting layer consists of one or more first ion-conducting polymers, and, optionally, one or both of (i) a polytetrafluoroethylene (PTFE), polyvinylidene fluoride (PVDF), poly ether ether ketone (PEEK), or polyethylene (PE) reinforcing material, and (ii) a hydrogen peroxide decomposition catalyst, a radical scavenger, or both.

15. The catalyst-coated ion-conducting membrane according to claim 1, wherein the first and second ion-conducting layers do not include graphene-based platelets.

* * * * *